US012682865B2

(12) United States Patent
Charisoulis et al.

(10) Patent No.: US 12,682,865 B2
(45) Date of Patent: Jul. 14, 2026

(54) SYSTEMS AND METHODS FOR GENERATING BISTABLE FERROELECTRIC LIQUID CRYSTAL DRIVE SIGNALS

(71) Applicant: Meta Platforms Technologies, LLC, Menlo Park, CA (US)

(72) Inventors: Thomas Charisoulis, San Carlos, CA (US); Junhan Han, Redmond, WA (US); Yun Wang, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/978,403

(22) Filed: Dec. 12, 2024

(65) Prior Publication Data

US 2025/0191549 A1 Jun. 12, 2025

Related U.S. Application Data

(60) Provisional application No. 63/609,072, filed on Dec. 12, 2023.

(51) Int. Cl.
*G09G 3/36* (2006.01)

(52) U.S. Cl.
CPC ... *G09G 3/3677* (2013.01); *G09G 2310/0286* (2013.01); *G09G 2310/08* (2013.01); *G09G 2320/0666* (2013.01)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3658; G09G 3/3666; G09G 3/3674; G09G 3/3681; G09G 3/3685; G09G 3/3688; G09G 3/3692
USPC .................................................... 345/87–104
See application file for complete search history.

(56) References Cited

U.S. PATENT DOCUMENTS

| | | | | | |
|---|---|---|---|---|---|
| 5,617,229 | A * | 4/1997 | Yamamoto | G02F 1/136277 | 349/158 |
| 6,710,759 | B1 * | 3/2004 | Kondoh | G09G 3/3629 | 345/94 |
| 6,750,837 | B1 * | 6/2004 | Kondoh | G09G 3/3629 | 345/97 |
| 10,909,936 | B2 * | 2/2021 | Zehner | G02F 1/167 | |
| 2004/0113881 | A1 * | 6/2004 | Kim | G09G 3/3651 | 345/97 |
| 2004/0119932 | A1 * | 6/2004 | Kim | G09G 3/3651 | 349/172 |
| 2007/0242019 | A1 * | 10/2007 | Jung | G09G 3/3688 | 345/98 |
| 2011/0199353 | A1 * | 8/2011 | Chung | G11C 19/00 | 345/208 |

(Continued)

*Primary Examiner* — Ke Xiao
*Assistant Examiner* — Nelson Lam
(74) *Attorney, Agent, or Firm* — Greenberg Traurig, LLP

(57) ABSTRACT

A method for generating bistable ferroelectric liquid crystal drive signals may include storing, by an array of latches, colorfield data. The method may additionally include manipulating, by the array of latches and in response to a plurality of clock signals that include one or more outputs of the array of latches, the colorfield data. The method may also include providing, by one or more gates, one or more internal drive signals by comparing the one or more outputs of the array of latches. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2016/0140935 | A1* | 5/2016 | Hwang | G09G 3/20 345/204 |
| 2019/0172407 | A1* | 6/2019 | Chen | G09G 3/3611 |
| 2019/0180695 | A1* | 6/2019 | Ha | G09G 3/2051 |
| 2020/0184918 | A1* | 6/2020 | Kim | G09G 3/3611 |
| 2021/0193032 | A1* | 6/2021 | Yamasaki | G09G 3/3275 |
| 2022/0351661 | A1* | 11/2022 | Choi | G09G 3/20 |

* cited by examiner

SYSTEMS AND METHODS FOR GENERATING BISTABLE FERROELECTRIC LIQUID CRYSTAL DRIVE SIGNALS

CROSS REFERENCE TO RELATED APPLICATION

This application claims the benefit of U.S. Provisional Application No. 63/609,072, filed Dec. 12, 2023, the disclosure of which is incorporated, in its entirety, by this reference.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
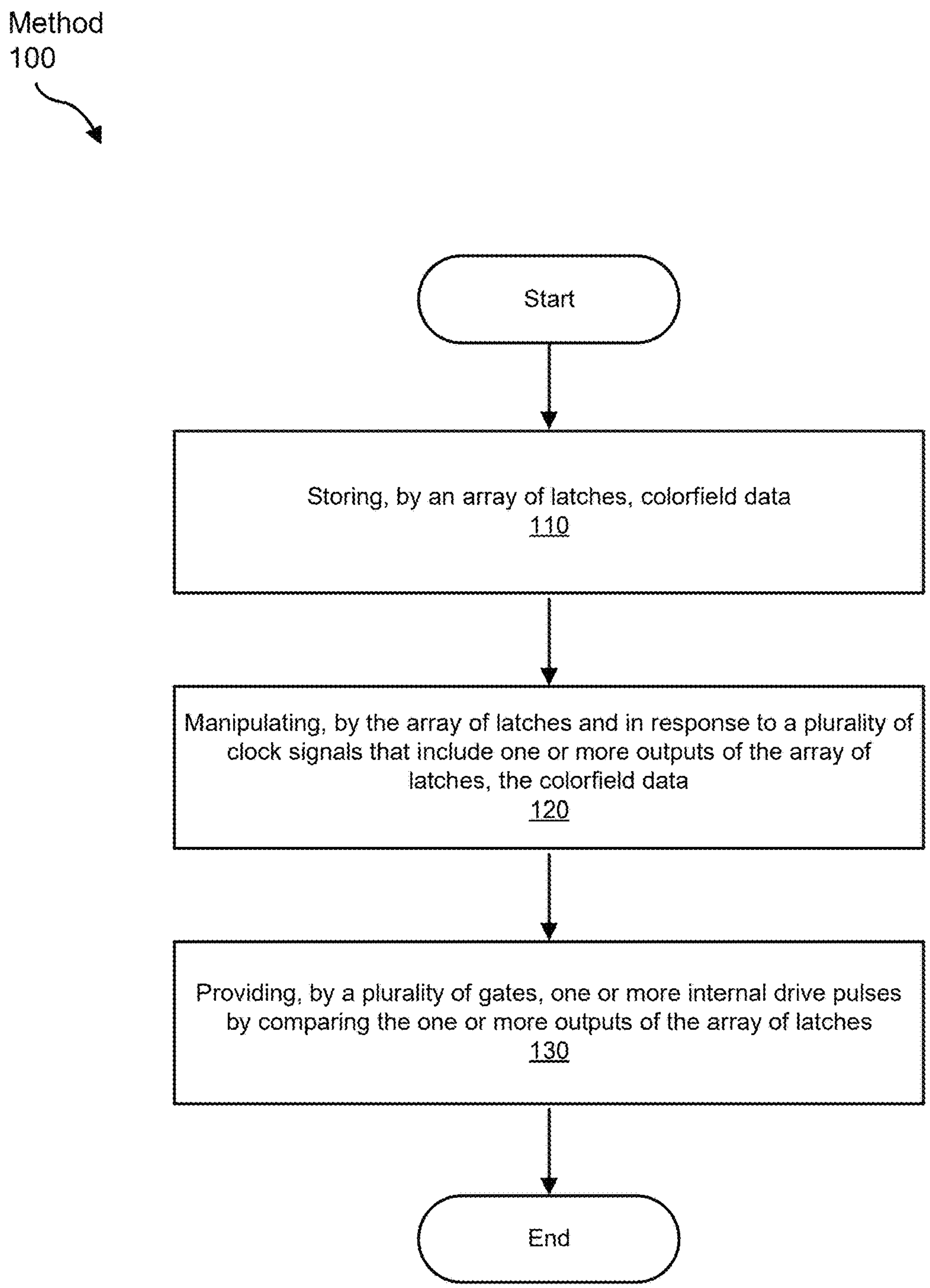
FIG. 1 is a flow diagram of exemplary methods for generating bistable ferroelectric liquid crystal drive signals.

Throughout the drawings, identical reference characters and descriptions indicate similar, but not necessarily identical, elements. While the examples described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Traditional liquid crystals (LCs) have an opacity that is a direct function of an applied voltage. In contrast, ferrous LCs (FLCs) require additional driving electronics due to their operation in the digital domain. Specifically, FLC states are either fully transparent or fully opaque and, thus, require a maximum driving amplitude pulse with variation of the pulse width being the only option for control of gray level (GL) luminance response generation.

FLCs require charge balancing and application of two pulses of precise width but opposite polarity to avoid charge accumulation that may result in the FLCs becoming permanently polarized and unable to switch between the fully transparent and fully opaque states. Bistable FLCs, however, have a latching nature and thus only require a short pulse width of opposite polarity to either latch (i.e., set) or reset between the fully transparent and fully opaque states.

The present disclosure is generally directed to systems and methods for generating bistable ferroelectric liquid crystal drive signals. For example, by using an array of latches both to store colorfield data and to manipulate the colorfield data in response to a plurality of clock signals that include one or more outputs of the array of latches, and by using gates to generate one or more internal drive signals by comparing one or more outputs of the array of latches, the disclosed systems and methods may achieve both data retention and data manipulation in a same circuit. This capability results in a more compact pixel circuit that may achieve a less costly silicon technology node that is capable of driving higher voltage signals (e.g., five volts) required to drive bistable FLCs while maintaining a pixel form factor required for miniature displays.

The following will provide, with reference to FIG. 1, detailed descriptions of exemplary methods for generating bistable ferroelectric liquid crystal drive signals. Detailed descriptions of exemplary drive signals are provided herein with reference to FIG. 2. Additionally, detailed descriptions of exemplary circuits for generating bistable ferroelectric liquid crystal drive signals are provided herein with reference to FIG. 3. Further, detailed descriptions of a timing diagram demonstrating exemplary generation of bistable ferroelectric liquid crystal drive signals is provided herein with reference to FIG. 4. Further, detailed descriptions of exemplary augmented-reality glasses that may be used in connection with embodiments of this disclosure are provided herein with reference to FIG. 5. Further, detailed descriptions of an exemplary virtual reality headset that may be used in connection with embodiments of this disclosure are provided herein with reference to FIG. 6.

Referring to FIG. 1, a method 100 for generating bistable ferroelectric liquid crystal drive signals is shown. At step 110, method 100 may include storing colorfield data. For example, step 110 may include storing, by an array of latches, colorfield data.

The term "latch," as used herein, may generally refer to a circuit that may store state information. For example, and without limitation, a latch may correspond to a flip flop, a bistable multivibrator, a set-reset latch, a gated latch, a D flip-flop, a T flip-flop, a JK flip-flop, etc. The circuit may be made to change state by signals applied to one or more control inputs and may output its state (e.g., sometimes along with its logical complement). Latches may be used as data storage elements to store a single bit (e.g., binary digit) of data. One of its two states may represent a "one" and the other may represent a "zero." Such data storage may be used for storage of state, and such a circuit may be described as sequential logic in electronics. When used in a finite-state machine, the output and next state may depend not only on its current input, but also on its current state (and hence, previous inputs). It may also be used for counting of pulses, and for synchronizing variably timed input signals to some reference timing signal.

The term "field expression," as used herein, may generally refer to a process of a frame of a single color being displayed. For example, and without limitation, field expression can refer to the process in which a display device translates digital values stored in each pixel, for all pixels in a frame, to LC transparency of a fixed pulse width accordingly. In the context of one or more implementations of the systems and methods disclosed herein, this field expression may be implemented into a control input signal fed into one or more de-multiplexers.

The term "colorfield data," as used herein, may generally refer to binary bits constituting at least a portion of data of a frame. For example, and without limitation, colorfield data may correspond to data, or a portion thereof, of a frame of a single color (e.g., due to color sequential operation of a display). In the context of one or more implementations of the systems and methods disclosed herein, this colorfield data may have a value that determines an amount of time (e.g., a number of clock cycles) that should pass before resetting a bistable FLC.

Method 100 may perform step 110 in various ways. In some implementations, step 110 may include providing, by a bus, the colorfield data in parallel to the array of latches. Loading the colorfield data in parallel in this manner may minimize loading time and simplify timing. Also, in some of these implementations, the colorfield data may correspond to a binary value of two or more bits, and the bits of the colorfield data may be simultaneously loaded into two or more latches of the array (e.g., one bit per latch). Additionally, an initial value (e.g., a binary value) of the colorfield data may be selected to determine an amount of time until a manipulated (e.g., incremented) value of the colorfield data causes internal drive signal generation that results in resetting of a bistable FLC.

In an example in which the colorfield data corresponds to a four bit binary value loaded into four latches, the colorfield data may have an upper value limit of 1111 and further incrementing the colorfield data may cause it to roll over to 0000, which may correspond to a threshold value for triggering a drive signal that resets a bistable FLC. Accordingly, the initial value of the colorfield data in the range (e.g., between 1000 and 1111) may be selected to affect the amount of time until a manipulated (e.g., incremented) value of the colorfield data causes internal drive signal generation that results in resetting (e.g., to a fully opaque state) of the bistable FLC. In this example, if the initial value is closer to 1000, then the amount of time until reset will be greater than if the initial value were closer to 1111. In some implementations, the initial value of the colorfield data in the range (e.g., between 1000 and 1111) may be selected to affect the amount of time until a manipulated (e.g., incremented) value of the colorfield data causes internal drive signal generation that results in setting (e.g., back to zero volts) the drive signal. For example, the amount of time to set the drive signal may correspond to a predetermined amount of time after the resetting of the bistable FLC. In an example, after incrementing the colorfield data causes it to roll over to 0000 and trigger the reset of the bistable FLC, additional incrementing of the colorfield data may cause the value of the colorfield data to reach a threshold value (e.g., 0001) for setting the drive signal (e.g., back to zero volts) so that the bistable FLC remains in the reset state without further application of power.

At step 120, method 100 may include manipulating the colorfield data. For example, step 120 may include manipulating, by the array of latches and in response to a plurality of clock signals that include one or more outputs of the array of latches, the colorfield data.

The term "manipulating," as used herein, may generally refer to handling, controlling, influencing, or modifying. For example, and without limitation, manipulating colorfield data may refer to incrementing colorfield data that corresponds to a counter, flipping a bit of colorfield data, etc.

The term "clock signal," as used herein, may generally refer to a type of signal that oscillates between a high and low state. For example, and without limitation, a clock signal may correspond to an electronic logic signal (e.g., voltage and/or current) that oscillates between a high and low state at a constant frequency. A clock signal may be used like a metronome to synchronize actions of digital circuits.

The term "decoded," as used herein, may generally refer to modification of a coded input into a different coded output. For example, and without limitation, a signal may be decoded by a decoder, which may have multiple inputs and one or more outputs. Such a decoder may convert coded inputs into coded outputs, where the input and output codes are different.

Method 100 may perform step 120 in various ways. For example, step 120 may include manipulating the colorfield data, by a first latch of the array of latches, in response to a clock signal (e.g., provided by a clock generation circuit) and manipulating the colorfield data, by a second latch of the array of latches, in response to a decoded output of the first latch. In some of these implementations, step 120 may additionally include manipulating the colorfield data, by a third latch of the array of latches, in response to a decoded output of the second latch. In some of these implementations, step 120 may also include manipulating the colorfield data, by a fourth latch of the array of latches, in response to a decoded output of the third latch. Additional or alternative implementations may include yet further latches that manipulate the colorfield data based on one or more decoded outputs of one of the other latches.

In any of the above implementations, the array of latches may initially store a series of bits loaded into the latches in step 110. For example, the first latch may store a least significant bit that is switched between zero and one at a rate determined by a clock signal, and the second latch may store a next least significant bit that is switched between zero and one at a rate determined by a decoded output of the first latch. Continuing in this manner, an ultimate latch (e.g., the fourth latch in an example in which the value corresponds to four bits) may store a most significant bit and a penultimate latch (e.g., the third latch in this example) may store a next most significant bit. In this way, the array of latches may both retain and manipulate memory in pixel (MiP) data (e.g., colorfield data) using the same set of latches and data to determine when to internally reset a bistable FLC (e.g., both store and manipulate a counter that affects a gray scale emission level achieved using the bistable FLC). This capability reduces costs and semiconductor device area consumption. The array of latches may also achieve homogeneous clocking between the different operating phases to function as a binary ramp and require utilization of only one clock generation circuit, further reducing costs and semiconductor device area consumption.

At step 130, method 100 may include providing one or more drive signals. For example, step 130 may include providing, by one or more gates, one or more internal drive signals by comparing the one or more outputs of the array of latches.

The term "drive signals," as used herein, may generally refer to signals for triggering an electronic component. For example, and without limitation, drive signals may correspond to signals for setting and/or resetting a bistable FLC. In this context, internal drive signals may refer to such signals that are generated internally, using the array of latches, as opposed to external drive signals that are generated independently of the array of latches.

Method 100 may perform step 130 in various ways. For example, the gates may include a plurality of AND gates that may be configured to provide the one or more internal drive signals when the value of the colorfield data reaches a threshold and/or falls within a range defined by one or more thresholds. In such implementations, step 110 may include loading, by two or more decoders into the array of latches, one or more inverted outputs of the array of latches. For example, the initial colorfield data loaded into the latches at step 110 may not be inverted whereas colorfield data output by the latches and fed back into those latches may be inverted. Likewise, manipulation of the colorfield data at step 120 may occur in response to clock signals that include one or more decoded outputs of the array of latches that have been inverted as a result of the colorfield data output by the latches and fed back into those latches at step 110 being inverted. Step 130 may include one or more additional sub-steps. For example, step 130 may include resetting, by one or more flip flops (e.g., a set reset flip flop (SR FF)), a bistable FLC in response to the one or more internal drive signals provided by the one or more gates. Additionally or alternatively, step 130 may include setting, by one or more flip flops (e.g., a set reset flip flop (SR FF)), a drive signal (e.g., back to zero volts) in response to the one or more internal drive signals provided by the one or more gates. In some of these implementations, the method 100 may return to step 110 once the bistable FLC has been reset and the drive signal has been set back to zero volts.

In some implementations, step 130 may include setting, by the one or more flip flops, the bistable ferroelectric liquid crystal in response to one or more external drive signals. Then the procedures of steps 110-130 may automatically reset the bistable FLC by providing internal drive signals to reset the bistable FLC and set the drive pulse (e.g., back to zero volts). This procedure may be performed iteratively while reading in colorfield data values that determine the grey scale mission level produced by the bistable FLC by dictating the amount of time until the bistable FLC is reset (e.g., back to the fully opaque state). Additional details relating to a specific example of application of such procedures are detailed later herein with reference to FIG. 4.

Figure 2:
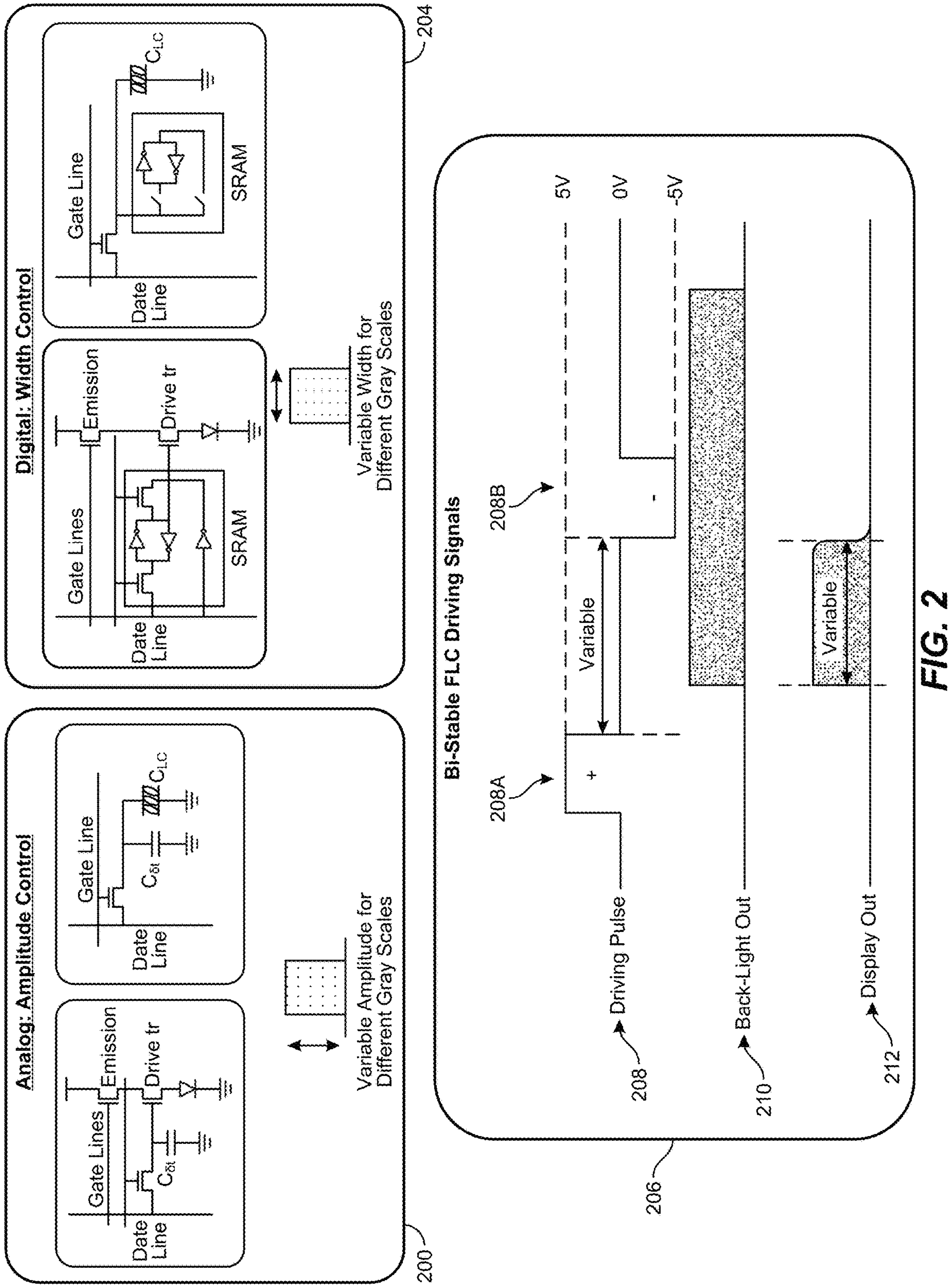
FIG. 2 is a block diagram of exemplary drive signals for various types of liquid crystals.

FIG. 2 illustrates exemplary drive signals for various types of LCs. For example, analog amplitude control 200 may vary the amplitude of a voltage applied to a traditional LC in order to directly impact the opacity of the LC and achieve different gray scale emissions. In contrast, FLCs may be driven using digital width control 204. Compared to analog amplitude control 200 and digital width control 204, bistable FLCs may be driven by more complex driving signals 206. For example, bistable FLCs, due to their latching nature, may be driven using a driving pulse 208 having short pulse widths of opposite polarity to set and reset the bistable FLC. In an example, the driving pulse 208 may have a positive polarity pulse 208A to set the bistable FLC to its fully transparent state, followed by a negative polarity pulse 208B to reset the bistable FLC to its fully opaque state. Each of the pulses 208A and 208B may return to zero voltage without impacting the state of the bistable FLC. A time between a falling edge of the positive polarity pulse 208A and a rising edge of the negative polarity pulse may vary. During this variable time frame, a backlight 210 may be turned on, causing illumination of a display pixel due to the fully transparent state of the bistable FLC, and the rising edge of the negative polarity pulse 208B may shut off the illumination of this display pixel even though the backlight 210 remains turned on. A resulting display output 212 thus may have a period of display pixel illumination that is variable in duration to affect a gray scale emission level.

Figure 3:
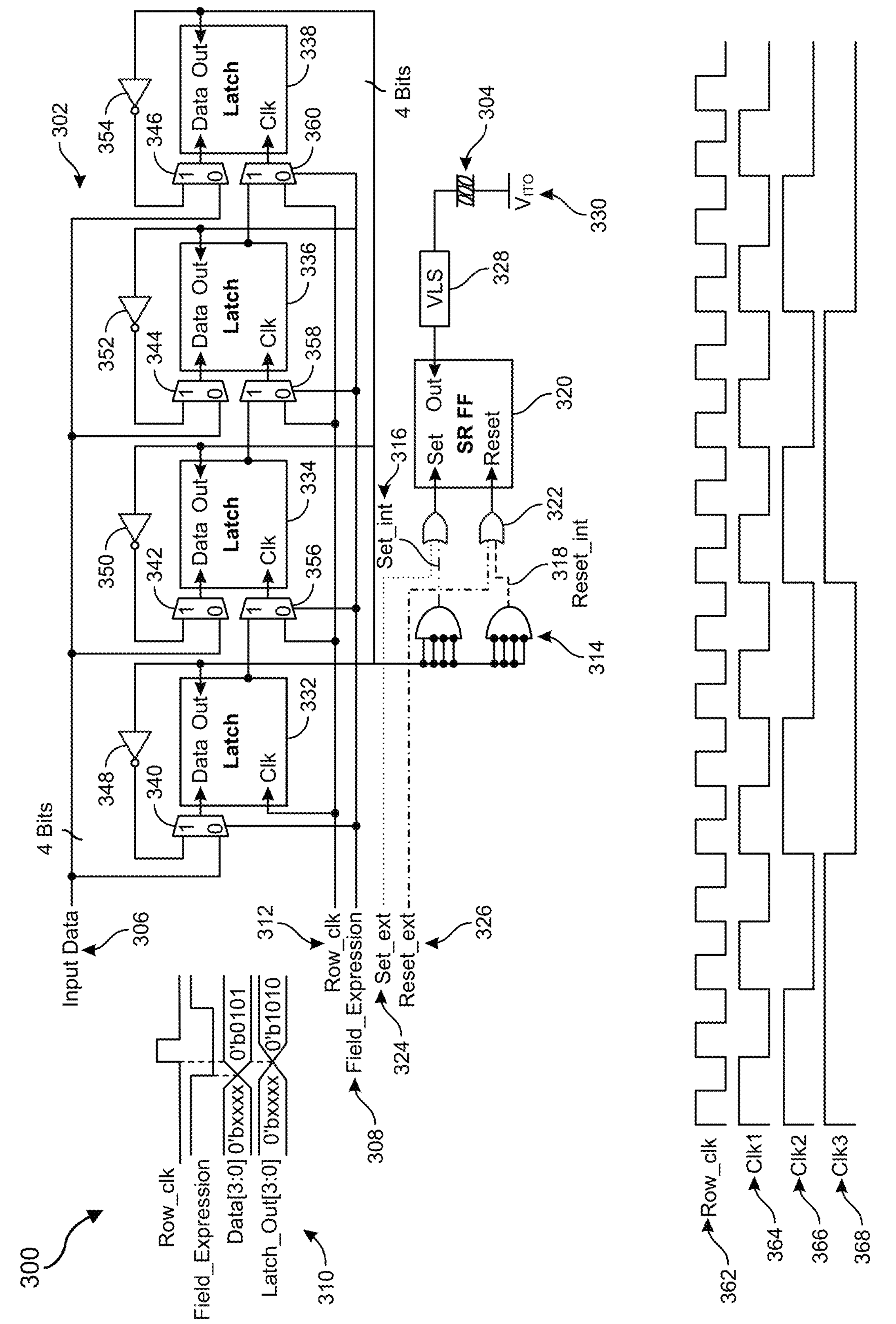
FIG. 3 is a block diagram of exemplary circuits for generating bistable ferroelectric liquid crystal drive signals.

FIG. 3 illustrates an exemplary circuit 300 for generating bistable ferroelectric liquid crystal drive signals. Circuit 300 not only may generate the complicated signals required by bistable FLCs but may also reuse the memory in pixel (MiP) as a local counter and save on area and circuit complication. In some implementations, circuit 300 may operate as a volatile memory array, with colorfield data being loaded into an array of latches 302 each time a bistable FLC 304 is set rather than reusing the colorfield data even if a gray scale emission level remains constant. Bits of input colorfield data 306 may be loaded in parallel (e.g., and in response to an externally controlled field expression 308 going low (e.g., equals a logical zero)) to minimize loading time as shown in a timing diagram 310. In some implementations, only one clock pulse 312 may be used per row to load the colorfield data 306. Utilizing only one clock may allow homogeneous clocking between different operating phases implemented by the array of latches 302. In some implementations, inverted colorfield data (e.g.: 1101 instead of 0010) out of the array of latches 302 may be used to facilitate use of AND gates 314 to perform comparisons and provide internal drive signals, such as an internal set drive signal 316 and an internal reset drive signal 318, to one or more latches, such as a set reset flip flop 320, via one or more OR gates 322. The set reset flip flop 320 may also receive one or more external drive signals, such as an external set drive signal 324 and an external reset drive signal 326 via the one or more OR gates 322. The bistable FLC 304 may receive an output from the set reset flip flop 320 via a voltage level shifter 328. The bistable FLC 304 may also receive an externally controlled indium tin oxide (IT) voltage 330 (VITO) from a common metal across a cell array that may be pulsed in order to allow for both positive and negative polarity signaling. The state of the bistable FLC 304 may be set or reset based on a combination of the voltage 330 and drive signal pulses output by the set reset flip flop 320 in response to the internal set drive signal 316, the internal reset drive signal 318, the external set drive signal 324, and the external reset drive signal 326.

The array of latches 302 in this example circuit 300 may include four latches, including a first latch 332, a second latch 334, a third latch 336, and a fourth latch 338. One or more decoders 340, 342, 344, and 346 may receive the bits of the input colorfield data 306 in parallel over a bus. Decoders 340, 342, 344, and 346 may also be configured to load the bits of the input colorfield data 306 into the first latch 332, the second latch 334, the third latch 336, and the fourth latch 338 when the field expression 308 is low (e.g., equals a logical zero). Decoders 340, 342, 344, and 346 may also be configured to receive inverted outputs of the first latch 332, the second latch 334, the third latch 336, and the fourth latch 338, respectively. For this purpose, inverters 348, 350, 352, and 354 may be located on the outputs of the first latch 332, the second latch 334, the third latch 336, and the fourth latch 338, respectively. Decoders 340, 342, 344, and 346 may further be configured to load the inverted outputs into the latches 332, and these inverted outputs may reflect the inverted values of the bits of colorfield data 306 as they are manipulated at rates determined by the clock pulse 312. However, the second latch 334, the third latch 336, and the fourth latch 338 may have decoders 356, 358, and 360 on their respective clock inputs that receive the field expression, the clock pulse 312, and outputs of other latches. Decoders 356, 358, and 360 may be configured to provide the clock pulse 312 to clock inputs of their respective latches when the field expression is low (e.g., equal to a logical zero) and provide the outputs of other latches to clock inputs of their respective latches when the field expression is high (e.g., equal to a logical one).

With the above configuration, the input colorfield data 306 may be loaded into the latches in parallel when the field expression is low, and the latches may manipulate their respective stored bits of the colorfield data 306 at different rates when the field expression is high. For example, first latch 332 may flip its stored bit at a rate determined by clock signal 362 provided by a clock generation circuit and its output may function as another clock signal 364 having a period equal to half the period of the clock signal 362. Additionally, the second latch 334 may flip its stored bit at a rate determined by clock signal 364 provided by the first latch 332. As a result, the output of the second latch 334 may function as yet another clock signal 366 having a period equal to half the period of the clock signal 364. Also, third latch 336 may flip its stored bit at a rate determined by clock signal 366 provided by the second latch 334. As a result, the output of the third latch 336 may function as still another clock signal 368 having a period equal to half the period of the clock signal 366. Further, fourth latch 338 may flip its stored bit at a rate determined by clock signal 368 provided by the third latch 336. In this way, the bits stored by the latches may function as a counter that is incremented by the array of latches 302 configured as a binary ramp. When the counter value rolls over to 0000, one of the AND gates 314 may generate the internal reset signal 318 and when it reaches 0001 another of the AND gates 314 may generate the internal set drive signal 316.

Figure 4:
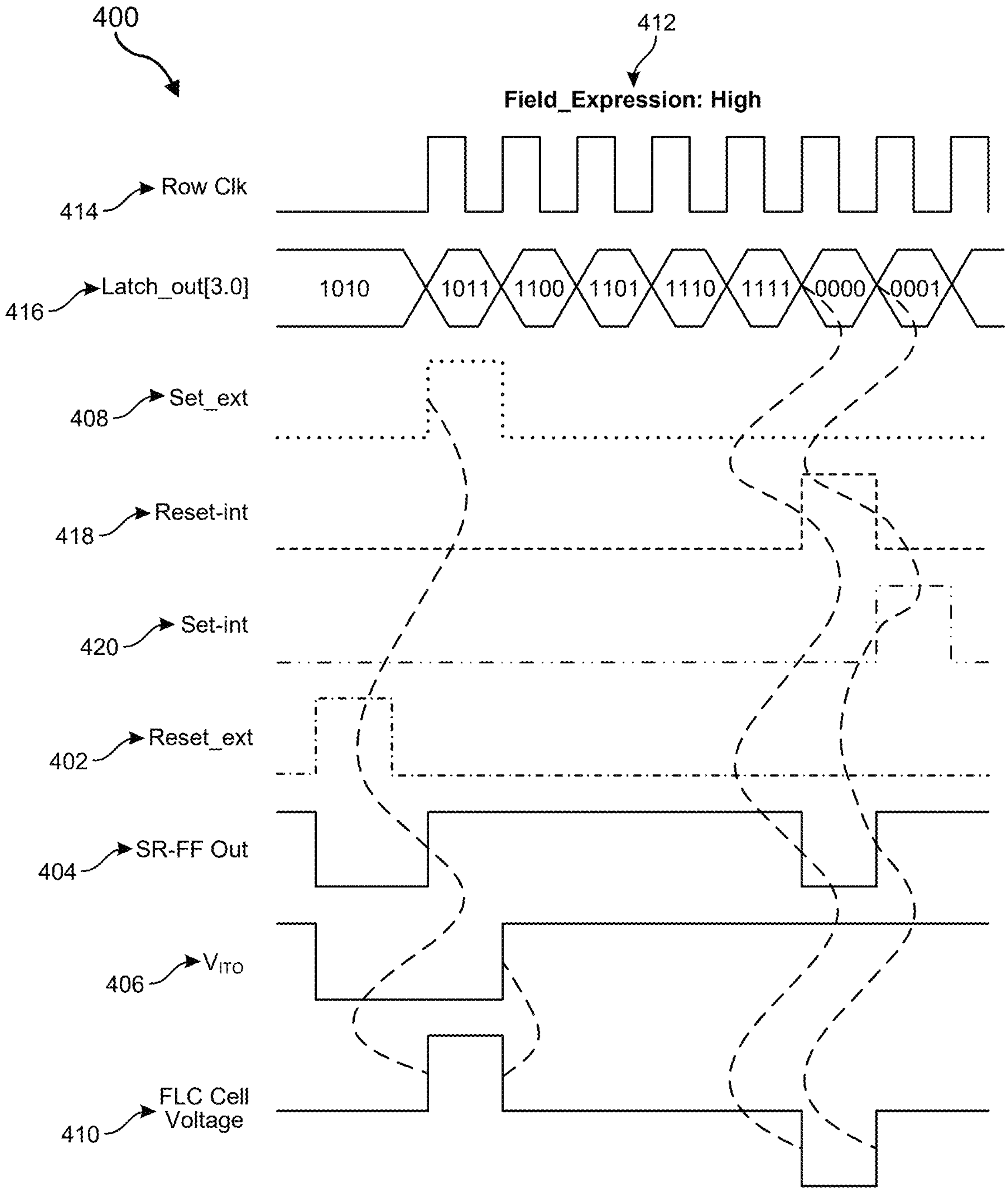
FIG. 4 is a timing diagram demonstrating exemplary generation of bistable ferroelectric liquid crystal drive signals.

FIG. 4 illustrates a timing diagram 400 demonstrating exemplary generation of bistable ferroelectric liquid crystal drive signals. For example, an external reset drive signal 402 may be received by a set reset flip flop and may cause a set reset flip flop output 404 to go low while an ITO voltage 406 is held low. Upon receipt of an external set drive signal 408, the signal 408 may cause the reset flip flop output 404 to go high while the ITO voltage 406 remains held low, creating a potential difference that may result in a bistable FLC cell voltage 410 going high (e.g., to five volts). When the bistable FLC cell voltage 410 goes high, the bistable FLC may be set to the fully transparent state, the input colorfield data (e.g., a binary value such as 1010) may be loaded into an array of latches, and a field expression control 412 may be set high. Thereafter, the ITO voltage 406 may go high, causing the bistable FLC cell voltage 410 to return to zero volts while the bistable FLC remains in the set state. Because the field expression control 412 is set high, a binary value stored by the array of latches may be incremented in response to a clock signal 414 from a single clock generation circuit, resulting in a latch output 416. When the latch output 416 rolls over to 0000, an AND gate of the circuit 300 of FIG. 3 may generate an internal reset drive signal 418, causing the set reset flip flop output 404 to go low. When the set reset flip flop output 404 goes low while the ITO voltage 406 is held high, the resulting potential difference may cause the bistable FLC cell voltage 410 to become negative (e.g., voltage across LC goes to negative five volts). When the bistable FLC cell voltage 410 goes high with negative polarity, the bistable FLC may be reset to the fully opaque state. Because the field expression control 412 is still held high, the counter may continue to increment until it reaches another threshold value (e.g., 0001) that triggers another AND gate of the circuit 300 of FIG. 3 to generate an internal set drive signal 420. The internal set drive signal 420 may cause the reset flip flop output 404 to go low, resulting in the bistable FLC cell voltage 410 returning to zero volts while the bistable FLC remains in the reset state. Thereafter, the field expression control 412 may be set low, which may cause the input colorfield data to be loaded into the array of latches. The input colorfield data loaded in this way may be the same binary value as the one that was previously loaded or a different binary value than the one that was previously loaded, and this value can determine a number of clock cycles that occur before the internal drive signals are generated, thus resetting the bistable FLC.

The following pseudocode demonstrates an example driving algorithm implemented by the circuit 300 of FIG. 3, operation of which is reflected by the timing diagram 400 of FIG. 4.

```
While True:
if field_expression == 0:
load (data+75µs off-pulse)
field_expression = 1
else:
counter==0:
Start Res pulse
counter==75:
Stop Res pulse
field_expression = 0
else:
counter++
```

As set forth above, the disclosed systems and methods may generate bistable ferroelectric liquid crystal drive signals. For example, by using an array of latches both to store colorfield data and to manipulate the colorfield data in response to a plurality of clock signals that include one or more outputs of the array of latches, and by using one or more gates to generate one or more internal drive signals by comparing one or more outputs of the array of latches, the disclosed systems and methods may achieve both data retention and data manipulation in a same circuit. This capability results in a more compact pixel circuit that may achieve a less costly silicon technology node that is capable of driving higher voltage signals (e.g., five volts) required to drive bistable FLCs while maintaining a pixel form factor required for miniature displays. Additional benefits include a requirement for only one clock to be shipped into a pixel array and support of rolling emission.

EXAMPLE EMBODIMENTS

Example 1: A circuit may include an array of latches configured to manipulate, in response to a plurality of clock signals that include one or more outputs of the array of latches, colorfield data stored in the array of latches, and one or more gates configured provide one or more internal drive signals by comparing the one or more outputs of the array of latches.

Example 2. The circuit of example 1, wherein the array of latches includes a first latch configured to manipulate the colorfield data in response to a clock signal, and a second latch configured to manipulate the colorfield data in response to a decoded output of the first latch.

Example 3. The circuit of any of examples 1 or 2, wherein the array of latches includes a third latch configured to manipulate the colorfield data in response to a decoded output of the second latch.

Example 4. The circuit of any of examples 1-3, wherein the array of latches includes a fourth latch configured to manipulate the colorfield data in response to a decoded output of the third latch.

Example 5. The circuit of any of examples 1-4, further including one or more flip flops configured to reset a bistable ferroelectric liquid crystal in response to the one or more internal drive signals provided by the one or more gates.

Example 6. The circuit of any of examples 1-5, wherein the one or more flip flops are further configured to set the bistable ferroelectric liquid crystal in response to one or more external drive signals.

Example 7. The circuit of any of examples 1-6, further including a bus configured to provide the colorfield data in parallel to the array of latches.

Example 8. The circuit of any of examples 1-7, wherein the one or more gates includes and gates, the circuit further including two or more decoders configured to load inverted outputs of the array of latches into the array of latches.

Example 9. A method may include storing, by an array of latches, colorfield data, manipulating, by the array of latches and in response to a plurality of clock signals that include one or more outputs of the array of latches, the colorfield data, and providing, by one or more gates, one or more internal drive signals by comparing the one or more outputs of the array of latches.

Example 10. The method of example 9, wherein the manipulating includes manipulating the colorfield data, by a first latch of the array of latches, in response to a clock signal, and manipulating the colorfield data, by a second latch of the array of latches, in response to a decoded output of the first latch.

Example 11. The method of any of examples 9 or 10, wherein the manipulating includes manipulating the colorfield data, by a third latch of the array of latches, in response to a decoded output of the second latch.

Example 12. The method of any of examples 9-11, wherein the manipulating includes manipulating the colorfield data, by a fourth latch of the array of latches, in response to a decoded output of the third latch.

Example 13. The method of any of examples 9-12, further including resetting, by one or more flip flops, a bistable ferroelectric liquid crystal in response to the one or more internal drive signals provided by the one or more gates.

Example 14. The method of any of examples 9-13, further including setting, by the one or more flip flops, the bistable ferroelectric liquid crystal in response to one or more external drive signals.

Example 15. The method of any of examples 9-14, further including providing, by a bus, the colorfield data in parallel to the array of latches.

Example 16. The method of any of examples 9-15, wherein the one or more gates includes and gates, the method further including loading, by two or more decoders into the array of latches, one or more inverted outputs of the array of latches.

Example 17. A system may include an active display including at least one bistable ferroelectric liquid crystal, and a circuit including an array of latches configured to manipulate, in response to a plurality of clock signals that include one or more outputs of the array of latches, colorfield data stored in the array of latches, one or more gates configured to provide one or more internal drive signals by comparing the one or more outputs of the array of latches, and one or more flip flops configured to reset the at least one bistable ferroelectric liquid crystal in response to the one or more internal drive signals provided by the one or more gates.

Example 18. The system of example 17, wherein the array of latches includes a first latch configured to manipulate the colorfield data in response to a clock signal, a second latch configured to manipulate the colorfield data in response to a decoded output of the first latch, a third latch configured to manipulate the colorfield data in response to a decoded output of the second latch, and a fourth latch configured to manipulate the colorfield data in response to a decoded output of the third latch.

Example 19. The system of any of examples 17 or 18, further including a bus configured to provide the colorfield data in parallel to the array of latches.

Example 20. The system of any of examples 17-19, wherein the one or more gates includes and gates, the circuit further including two or more decoders configured to load one or more inverted outputs of the array of latches into the array of latches.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality-systems may be designed to work without near-eye displays (NEDs). Other artificial—reality systems may include an NED that also provides visibility into the real world (such as, e.g., augmented-reality system 500 in FIG. 5) or that visually immerses a user in an artificial reality (such as, e.g., virtual-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 5:
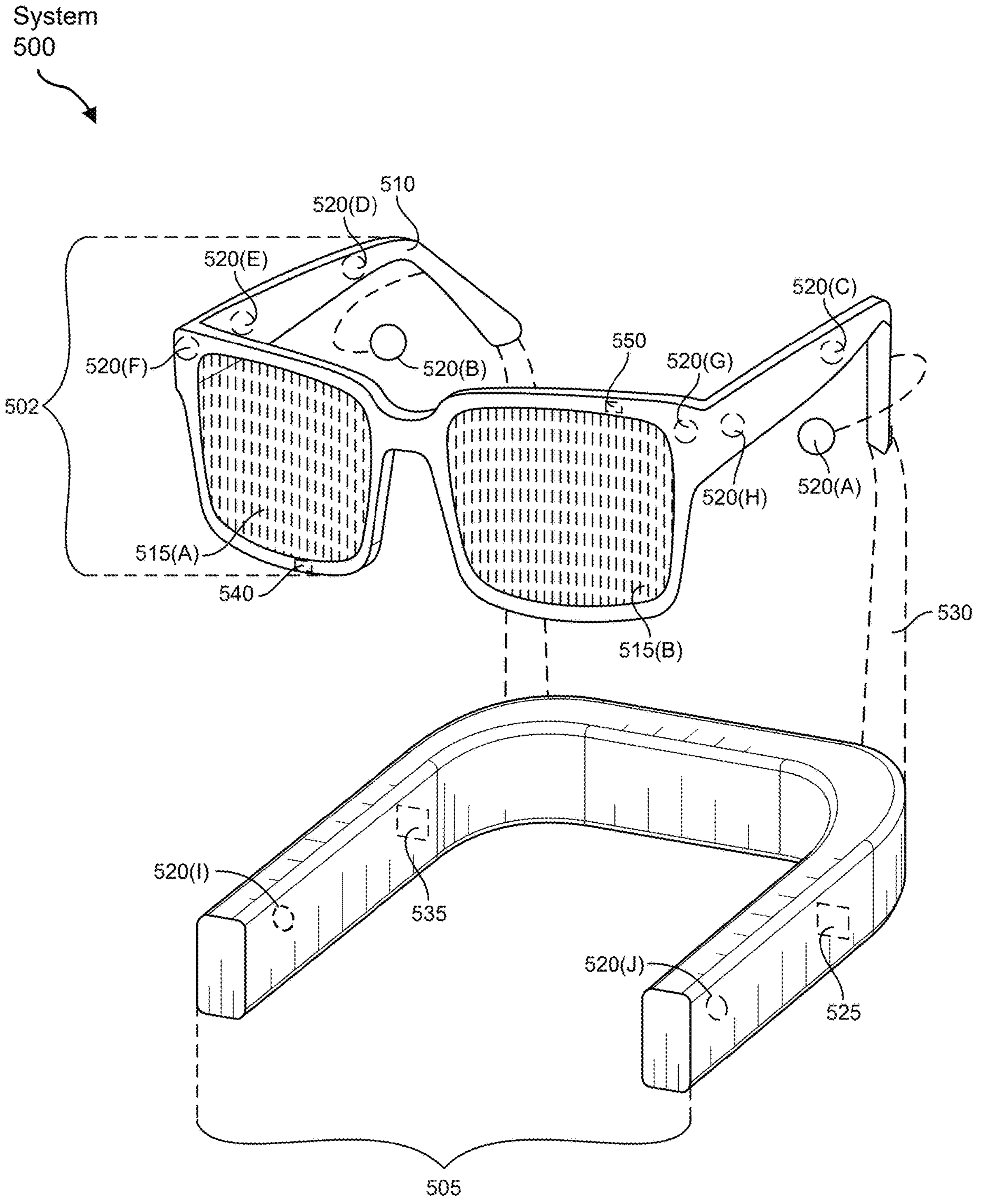
FIG. 5 is an illustration of exemplary augmented-reality glasses that may be used in connection with embodiments of this disclosure.
Figure 6:
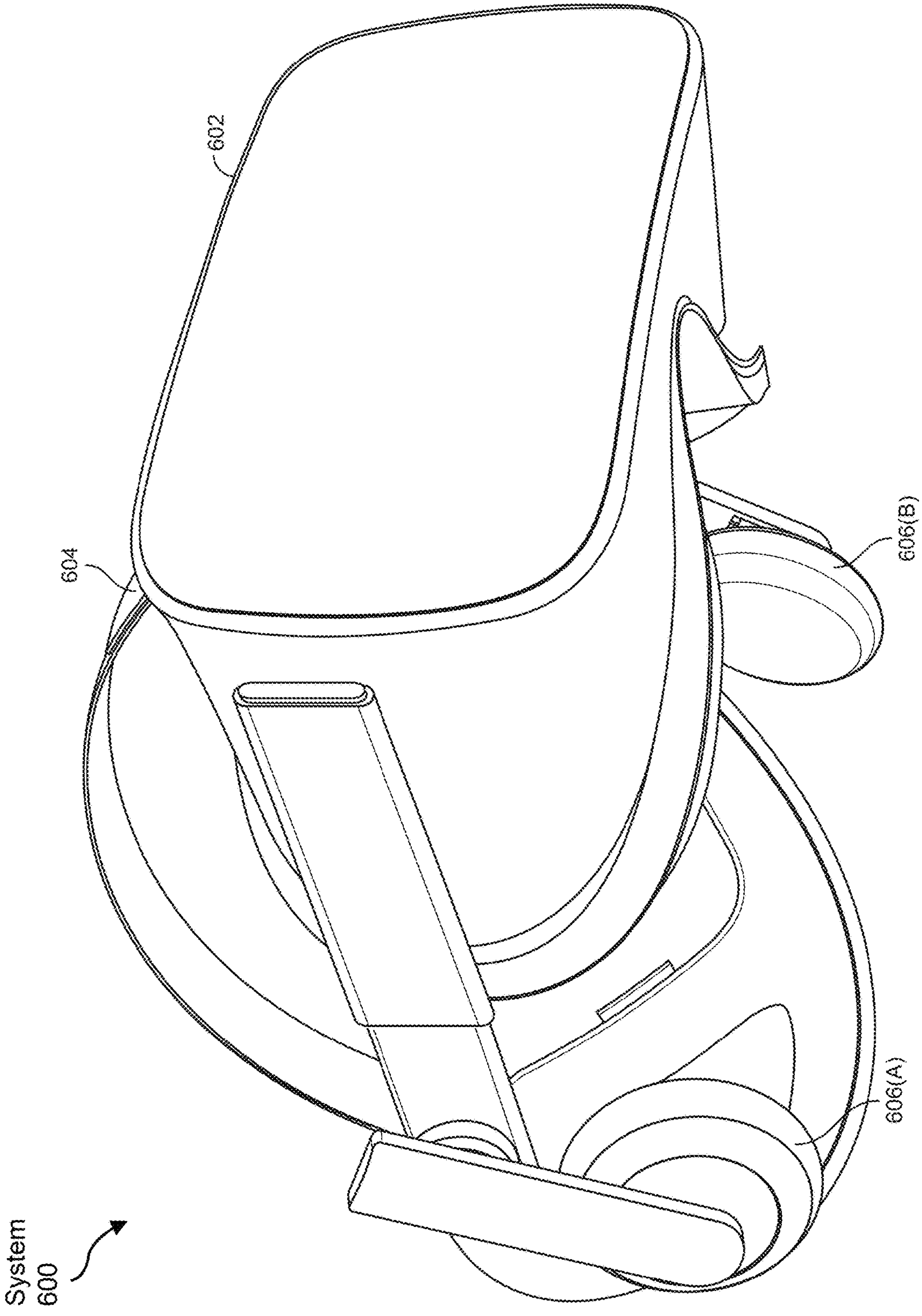
FIG. 6 is an illustration of an exemplary virtual-reality headset that may be used in connection with embodiments of this disclosure.

Turning to FIG. 5, augmented-reality system 500 may include an eyewear device 502 with a frame 510 configured to hold a left display device 515(A) and a right display device 515(B) in front of a user's eyes. Display devices 515(A) and 515(B) may act together or independently to present an image or series of images to a user. While augmented-reality system 500 includes two displays, embodiments of this disclosure may be implemented in augmented-reality systems with a single NED or more than two NEDs.

In some embodiments, augmented-reality system 500 may include one or more sensors, such as sensor 540. Sensor 540 may generate measurement signals in response to motion of augmented-reality system 500 and may be located on substantially any portion of frame 510. Sensor 540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 500 may or may not include sensor 540 or may include more than one sensor. In embodiments in which sensor 540 includes an IMU, the IMU may generate calibration data based on measurement signals from sensor 540. Examples of sensor 540 may include, without limitation, accelerometers, gyroscopes, magnetometers, other suitable types of sensors that detect motion, sensors used for error correction of the IMU, or some combination thereof.

In some examples, augmented-reality system 500 may also include a microphone array with a plurality of acoustic transducers 520(A)-520(J), referred to collectively as acoustic transducers 520. Acoustic transducers 520 may represent transducers that detect air pressure variations induced by sound waves. Each acoustic transducer 520 may be configured to detect sound and convert the detected sound into an electronic format (e.g., an analog or digital format). The microphone array in FIG. 5 may include, for example, ten acoustic transducers: 520(A) and 520(B), which may be designed to be placed inside a corresponding ear of the user, acoustic transducers 520(C), 520(D), 520(E), 520(F), 520(G), and 520(H), which may be positioned at various locations on frame 510, and/or acoustic transducers 520(I) and 520(J), which may be positioned on a corresponding neckband 505.

In some embodiments, one or more of acoustic transducers 520(A)-(J) may be used as output transducers (e.g., speakers). For example, acoustic transducers 520(A) and/or 520(B) may be earbuds or any other suitable type of headphone or speaker.

The configuration of acoustic transducers 520 of the microphone array may vary. While augmented-reality system 500 is shown in FIG. 5 as having ten acoustic transducers 520, the number of acoustic transducers 520 may be greater or less than ten. In some embodiments, using higher numbers of acoustic transducers 520 may increase the amount of audio information collected and/or the sensitivity and accuracy of the audio information. In contrast, using a lower number of acoustic transducers 520 may decrease the computing power required by an associated controller 550 to process the collected audio information. In addition, the position of each acoustic transducer 520 of the microphone array may vary. For example, the position of an acoustic transducer 520 may include a defined position on the user, a defined coordinate on frame 510, an orientation associated with each acoustic transducer 520, or some combination thereof.

Acoustic transducers 520(A) and 520(B) may be positioned on different parts of the user's ear, such as behind the pinna, behind the tragus, and/or within the auricle or fossa. Or, there may be additional acoustic transducers 520 on or surrounding the ear in addition to acoustic transducers 520 inside the ear canal. Having an acoustic transducer 520 positioned next to an ear canal of a user may enable the microphone array to collect information on how sounds arrive at the ear canal. By positioning at least two of acoustic transducers 520 on either side of a user's head (e.g., as binaural microphones), augmented reality system 500 may simulate binaural hearing and capture a 3D stereo sound field around about a user's head. In some embodiments, acoustic transducers 520(A) and 520(B) may be connected to augmented-reality system 500 via a wired connection 530, and in other embodiments acoustic transducers 520(A) and 520(B) may be connected to augmented-reality system 500 via a wireless connection (e.g., a BLUETOOTH connection). In still other embodiments, acoustic transducers 520(A) and 520(B) may not be used at all in conjunction with augmented-reality system 500.

Acoustic transducers 520 on frame 510 may be positioned in a variety of different ways, including along the length of the temples, across the bridge, above or below display devices 515(A) and 515(B), or some combination thereof. Acoustic transducers 520 may also be oriented such that the microphone array is able to detect sounds in a wide range of directions surrounding the user wearing the augmented-reality system 500. In some embodiments, an optimization process may be performed during manufacturing of augmented-reality system 500 to determine relative positioning of each acoustic transducer 520 in the microphone array.

In some examples, augmented-reality system 500 may include or be connected to an external device (e.g., a paired device), such as neckband 505. Neckband 505 generally represents any type or form of paired device. Thus, the following discussion of neckband 505 may also apply to various other paired devices, such as charging cases, smart watches, smart phones, wrist bands, other wearable devices, hand-held controllers, tablet computers, laptop computers, other external compute devices, etc.

As shown, neckband 505 may be coupled to eyewear device 502 via one or more connectors. The connectors may be wired or wireless and may include electrical and/or non-electrical (e.g., structural) components. In some cases, eyewear device 502 and neckband 505 may operate independently without any wired or wireless connection between them. While FIG. 5 illustrates the components of eyewear device 502 and neckband 505 in example locations on eyewear device 502 and neckband 505, the components may be located elsewhere and/or distributed differently on eyewear device 502 and/or neckband 505. In some embodiments, the components of eyewear device 502 and neckband 505 may be located on one or more additional peripheral devices paired with eyewear device 502, neckband 505, or some combination thereof.

Pairing external devices, such as neckband 505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 500 may be provided by a paired device or shared between a paired device and an eyewear device, thus reducing the weight, heat profile, and form factor of the eyewear device overall while still retaining desired functionality. For example, neckband 505 may allow components that would otherwise be included on an eyewear device to be included in neckband 505 since users may tolerate a heavier weight load on their shoulders than they would tolerate on their heads. Neckband 505 may also have a larger surface area over which to diffuse and disperse heat to the ambient environment. Thus, neckband 505 may allow for greater battery and computation capacity than might otherwise have been possible on a stand-alone eyewear device. Since weight carried in neckband 505 may be less invasive to a user than weight carried in eyewear device 502, a user may tolerate wearing a lighter eyewear device and carrying or wearing the paired device for greater lengths of time than a user would tolerate wearing a heavy standalone eyewear device, thereby enabling users to more fully incorporate artificial—reality environments into their day-to-day activities.

Neckband 505 may be communicatively coupled with eyewear device 502 and/or to other devices. These other devices may provide certain functions (e.g., tracking, localizing, depth mapping, processing, storage, etc.) to augmented-reality system 500. In the embodiment of FIG. 5, neckband 505 may include two acoustic transducers (e.g., 520(I) and 520(J)) that are part of the microphone array (or potentially form their own microphone subarray). Neckband 505 may also include a controller 525 and a power source 535.

Acoustic transducers 520(I) and 520(J) of neckband 505 may be configured to detect sound and convert the detected sound into an electronic format (analog or digital). In the embodiment of FIG. 5, acoustic transducers 520(1) and 520(J) may be positioned on neckband 505, thereby increasing the distance between the neckband acoustic transducers 520(I) and 520(J) and other acoustic transducers 520 positioned on eyewear device 502. In some cases, increasing the distance between acoustic transducers 520 of the microphone array may improve the accuracy of beamforming performed via the microphone array. For example, if a sound is detected by acoustic transducers 520(C) and 520(D) and the distance between acoustic transducers 520(C) and 520 (D) is greater than, e.g., the distance between acoustic transducers 520(D) and 520(E), the determined source location of the detected sound may be more accurate than if the sound had been detected by acoustic transducers 520(D) and 520(E).

Controller 525 of neckband 505 may process information generated by the sensors on neckband 505 and/or augmented-reality system 500. For example, controller 525 may process information from the microphone array that describes sounds detected by the microphone array. For each detected sound, controller 525 may perform a direction-of-arrival (DOA) estimation to estimate a direction from which the detected sound arrived at the microphone array. As the microphone array detects sounds, controller 525 may populate an audio data set with the information. In embodiments in which augmented-reality system 500 includes an inertial measurement unit, controller 525 may compute all inertial and spatial calculations from the IMU located on eyewear device 502. A connector may convey information between augmented-reality system 500 and neckband 505 and between augmented-reality system 500 and controller 525. The information may be in the form of optical data, electrical data, wireless data, or any other transmittable data form. Moving the processing of information generated by augmented-reality system 500 to neckband 505 may reduce weight and heat in eyewear device 502, making it more comfortable to the user.

Power source 535 in neckband 505 may provide power to eyewear device 502 and/or to neckband 505. Power source 535 may include, without limitation, lithium-ion batteries, lithium-polymer batteries, primary lithium batteries, alkaline batteries, or any other form of power storage. In some cases, power source 535 may be a wired power source. Including power source 535 on neckband 505 instead of on eyewear device 502 may help better distribute the weight and heat generated by power source 535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 600 in FIG. 6, that mostly or completely covers a user's field of view. Virtual-reality system 600 may include a front rigid body 602 and a band 604 shaped to fit around a user's head. Virtual-reality system 600 may also include output audio transducers 606(A) and 606(B). Furthermore, while not shown in FIG. 6, front rigid body 602 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 500 and/or virtual-reality system 600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 500 and/or virtual-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 500 and/or virtual-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial—reality devices, within other artificial—reality devices, and/or in conjunction with other artificial—reality devices.

By providing haptic sensations, audible content, and/or visual content, artificial—reality systems may create an entire virtual experience or enhance a user's real-world experience in a variety of contexts and environments. For instance, artificial—reality systems may assist or extend a user's perception, memory, or cognition within a particular environment. Some systems may enhance a user's interactions with other people in the real world or may enable more immersive interactions with other people in a virtual world. Artificial—reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial—reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A circuit comprising:

an array of latches configured to manipulate, in response to a plurality of clock signals that include one or more outputs of the array of latches, colorfield data stored in the array of latches;

one or more gates configured provide one or more internal drive signals by comparing the one or more outputs of the array of latches; and one or more flip flops configured to reset a bistable ferroelectric liquid crystal in response to the one or more internal drive signals provided by the one or more gates.

2. The circuit of claim 1, wherein the array of latches includes:

a first latch configured to manipulate the colorfield data in response to a clock signal; and a second latch configured to manipulate the colorfield data in response to a decoded output of the first latch.

3. The circuit of claim 2, wherein the array of latches includes:

a third latch configured to manipulate the colorfield data in response to a decoded output of the second latch.

4. The circuit of claim 3, wherein the array of latches includes:

a fourth latch configured to manipulate the colorfield data in response to a decoded output of the third latch.

5. The circuit of claim 1, wherein the one or more flip flops are further configured to set the bistable ferroelectric liquid crystal in response to one or more external drive signals.

6. The circuit of claim 1, further comprising:

a bus configured to provide the colorfield data in parallel to the array of latches.

7. The circuit of claim 1, further comprising:

two or more decoders configured to load inverted outputs of the array of latches into the array of latches.

8. A method comprising:

storing, by an array of latches, colorfield data;

manipulating, by the array of latches and in response to a plurality of clock signals that include one or more outputs of the array of latches, the colorfield data;

providing, by one or more gates, one or more internal drive signals by comparing the one or more outputs of the array of latches; and resetting, by one or more flip flops, a bistable ferroelectric liquid crystal in response to the one or more internal drive signals provided by the one or more gates.

9. The method of claim 8, wherein the manipulating includes:

manipulating the colorfield data, by a first latch of the array of latches, in response to a clock signal; and manipulating the colorfield data, by a second latch of the array of latches, in response to a decoded output of the first latch.

10. The method of claim 9, wherein the manipulating includes:

manipulating the colorfield data, by a third latch of the array of latches, in response to a decoded output of the second latch.

11. The method of claim 10, wherein the manipulating includes:

manipulating the colorfield data, by a fourth latch of the array of latches, in response to a decoded output of the third latch.

12. The method of claim 8, further comprising:

setting, by the one or more flip flops, the bistable ferroelectric liquid crystal in response to one or more external drive signals.

13. The method of claim 8, further comprising:

providing, by a bus, the colorfield data in parallel to the array of latches.

14. The method of claim 8, the method further comprising:

loading, by two or more decoders into the array of latches, one or more inverted outputs of the array of latches.

15. A system comprising:

an active display including at least one bistable ferroelectric liquid crystal; and a circuit comprising:

an array of latches configured to manipulate, in response to a plurality of clock signals that include one or more outputs of the array of latches, colorfield data stored in the array of latches;

one or more gates configured to provide one or more internal drive signals by comparing the one or more outputs of the array of latches; and one or more flip flops configured to reset the at least one bistable ferroelectric liquid crystal in response to the one or more internal drive signals provided by the one or more gates.

16. The system of claim 15, wherein the array of latches includes:

a first latch configured to manipulate the colorfield data in response to a clock signal; and a second latch configured to manipulate the colorfield data in response to a decoded output of the first latch.

17. The system of claim 16, further comprising:

a third latch configured to manipulate the colorfield data in response to a decoded output of the second latch.

18. The system of claim 17, further comprising:

a fourth latch configured to manipulate the colorfield data in response to a decoded output of the third latch.

19. The system of claim 15, further comprising:

a bus configured to provide the colorfield data in parallel to the array of latches.

20. The system of claim 15, the circuit further comprising:

two or more decoders configured to load one or more inverted outputs of the array of latches into the array of latches.

* * * * *